United States Patent

[11] 3,552,516

| [72] | Inventors | Lawrence Ray Beard;<br>Lewis Kie Davis, Waterloo, Iowa |
|---|---|---|
| [21] | Appl. No. | 789,774 |
| [22] | Filed | Jan. 8, 1969 |
| [45] | Patented | Jan. 5, 1971 |
| [73] | Assignee | Deere & Company<br>Moline, Ill.<br>a corporation of Delaware |

[54] MECHANICAL TRANSMISSION AND HYDROSTATIC FOUR-WHEEL DRIVE CONTROL INTERLOCK
4 Claims, 4 Drawing Figs.

[52] U.S. Cl. .................................................... 180/66, 60/53
[51] Int. Cl. ...................................................... B60k 23/08
[50] Field of Search ............................................. 180/66, 6.48, 6.3, 44; 60/53; 74/872

[56] References Cited
UNITED STATES PATENTS
3,272,277  9/1966  Budzich.......................... 180/66X
3,272,279  9/1966  Budzich.......................... 180/66X
3,458,005  7/1969  Malm et al...................... 180/66X
3,480,099  11/1969  Nighswonger et al. ....... 180/66X

*Primary Examiner*—Benjamin Hersh
*Assistant Examiner*—Milton L. Smith
*Attorneys*—H. Vincent Harsha, Harold M. Knoth, William A. Murray, John M. Nolan and Jimmie R. Oaks ABSTRACT: A four-wheel drive tractor having transmission means connected to the rear wheels, gear and range shift levers for manipulating the transmission to various modes of operation, a hydraulic pump and a pair of hydraulic motors for driving the front wheels, a solenoid-operated valve for controlling the operation of the hydraulic fluid motors, and electrical circuit means for controlling the current to said control valve and including a series of switches operated in response to movement of the gear and range shift levers to effect shifting of the control valve and thereby change the mode of operation of the fluid motors in response to changes in the modes of operation of the transmission.

INVENTORS
L. R. BEARD
L. K. DAVIS

INVENTORS
L. R. BEARD
L. K. DAVIS

MECHANICAL TRANSMISSION AND HYDROSTATIC FOUR-WHEEL DRIVE CONTROL INTERLOCK

BACKGROUND OF THE INVENTION

This invention relates to means for interlocking the transmission controls with the hydrostatic controls of a tractor having a conventional variable ratio transmission for driving the rear wheels and a hydrostatic drive for driving the front wheels and represents an alternate to the commonly assigned and copending U.S. application Ser. No. 686,177, filed 28 Nov. 1967 now U.S. Pat. No. 3,480,099 issued Nov. 29, 1969.

The above-noted copending application discloses a control interlock wherein cam and follower means are movable in concert with a single lever for establishing a selected mode of operation of the transmission and which operate to open and close four switches which selectively disrupt or connect electric current flow to a solenoid-operated, flow direction, control valve. It is known to provide a tractor with a pair of transmission control levers, one a gear shift and the other a range shift lever, for manipulating the transmission to select a desired mode of operation.

SUMMARY OF THE INVENTION

According to the present invention, a novel control interlock is provided between an auxiliary hydrostatic front wheel drive and a tractor transmission, which selects desired modes of operation by a pair of shifting levers, whereby desired modes of operation of the hydrostatic drive are automatically obtained by changing the modes of operation of the transmission drive.

A more specific feature of the invention resides in the provision of three switches, two of which are respectively controlled by direct engagement by the gear and range shift levers and the other of which is controllable by a pair of pivoted levers, which are respectively engageable by the gear and range shift levers, the switches controlling the operation of an electrically operated direction control valve for automatically establishing fluid flow for driving the fluid motors of the front wheels forwardly and reversely, respectively, in response to shifting the transmission to forward and reverse and for automatic disconnection of the fluid to the front wheel drives when the transmission is shifted to neutral or when the tractor speed, as determined by the ratio in the transmission, exceeds a predetermined value.

DESCRIPTION OF THE PREFERRED EMBODIMENT

Figure 1:
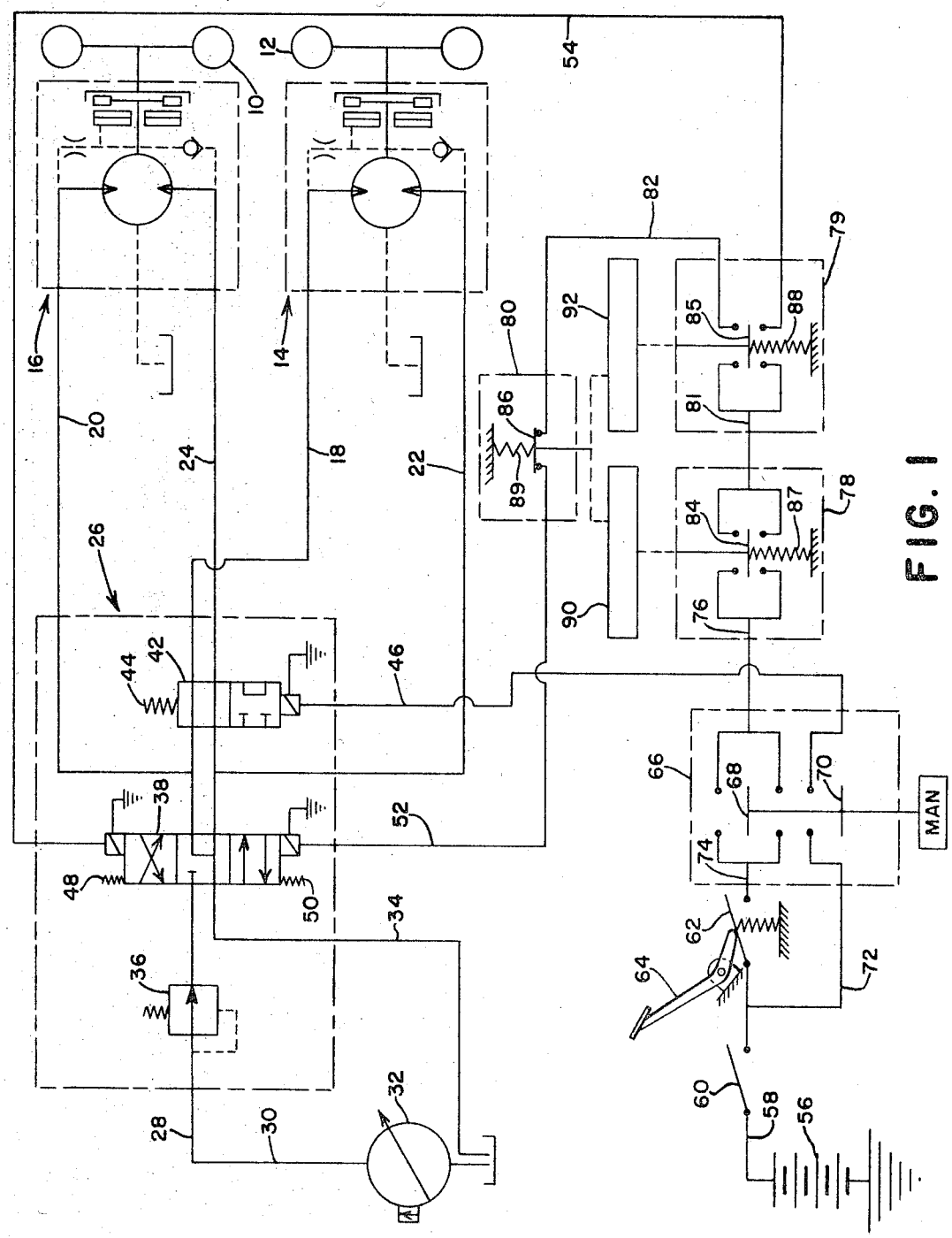
FIG. 1 is a schematic illustration of a hydrostatic front-wheel drive system including the control system in which the present invention is embodied.

The invention is embodied in a tractor hydrostatic front-wheel drive system which is schematically shown in FIG. 1. The tractor has front wheels 10 and 12, respectively, drivable through hydrostatic wheel motor units 14 and 16. The units 14 and 16 respectively have inlet conduits 18 and 20 and outlet conduits 22 and 24. The inlet and outlet conduits are so described with reference to the fluid flow therethrough when the wheels are driven forwardly. Of course, the flow will be reversed when the wheels are to be driven rearwardly.

The flow of pressurized fluid to the motor units 14 and 16 is controlled by a valve package denoted generally by the numeral 26 and having an inlet line 28 connected to an outlet line 30 of a pump 32, a return line 34 connected to reservoir, and a plurality of ports respectively connected to the lines 18, 20, 22, and 24. A priority valve 36 in the inlet line 28 automatically closes when the pressure in the line 28 falls below a predetermined value in order that other hydraulic functions (not shown) on the tractor are assured of an adequate fluid pressure supply.

The valve package also includes a solenoid-actuated direction control valve 38, which is maintained in a neutral condition, as shown in FIG. 1, when the front-wheel drive system is not operating. In this position, the inlet line 28 is blocked, and the lines 18 and 24 are both connected to the return line 34. When the valve is shifted to the position for forward rotation of the wheels 10 and 12, the inlet 28 is connected to the wheel unit inlet lines 18 and 20, and the outlet lines 22 and 24 are connected to the pump through the line 34. As is apparent from FIG. 1, the valve 38 is shiftable to a third position wherein the inlet line 28 is connected to the lines 22 and 24, and the lines 18 and 20 are connected to the return line 34, thereby reversing the flow through the wheel motor units 14 and 16.

The valve package 26 further includes a solenoid-operated series-parallel control valve 42, which is biased by a spring 44 to a parallel position, as shown in FIG. 1, wherein it connects the inlet line 18 for the wheel motor unit 14 with the inlet line 20 for the wheel motor unit 16, and similarly connects the outlet lines 22 and 24. The series-parallel valve 42 is shiftable to its series position in response to electric current in a solenoid lead 46, and in this position the outlet line 24 of the wheel unit 16 is connected to the inlet line 18 of the wheel unit 14. The direction control valve 38 is biased to its neutral position, as shown in FIG. 1, by a pair of springs 48 and 50 and is shiftable into its forward position by electric current in a solenoid lead 52 and is shifted into its reverse position by electric current in a solenoid lead 54.

The electric current for actuation of the valves 38 and 42 is supplied by the tractor battery 56. Extending from the battery 56 is a lead 58, wherein is found a conventional on-off ignition switch 60. A second switch 62 is also located in the lead 58, and the main transmission clutch pedal 64 operates to open the switch 62 when the clutch pedal 64 is depressed to disengage the tractor transmission. Thus, the current supplied to the direction control valve 38 is automatically cutoff when the transmission is disengaged, causing the direction control valve 38 to shift to its neutral position to disconnect fluid flow to the front wheel units.

A three-position manually-operated switch 66 controls both the direction control valve 38 and the series-parallel control valve 42 and includes a pair of switch elements 68 and 70, which are both in their closed position when the valve is shifted to connect the wheel units in series, only the switch element 68 being closed when the valve is shifted to connect the wheel motor units in parallel. When the ignition switch 60 is closed, and the clutch pedal 64 is in its engaged position so that the switch 62 is closed, leads 72 and 74 are energized by the battery 56. With the manually-operated switch 66 in its neutral position, as shown in FIG. 1, no current is permitted to flow to the solenoid-actuated valves 38 and 42, whereby the wheel drive system is maintained in its neutral condition. When the switch 66 is shifted so that the switch elements 68 and 70 are both closed, the upper branch of the lead 74 is connected to the upper branch of a lead 76, and the upper branch of the lead 72 is connected to the lead 46, whereby the solenoid valve 42 is shifted to its position wherein it connects wheel units 14 and 16 in series. The manually-operated switch is further shiftable to a position wherein only the switch element 68 is closed, connecting the bottom branch of the lead 74 to the bottom branch of the lead 76. As shown in FIG. 1, the lead 76 is selectively connected to the solenoid lead 54 through a pair of switches 78 and 79, while the lead 76 is connected to the other solenoid lead 52 through the switches 78 and 79 and a third switch 80. A lead 81 interconnects switches 78 and 79, and a lead 82 interconnects the switches 79 and 80.

As shown in FIG. 1, switches 78, 79, and 80 respectively have reciprocal elements 84, 85, and 86. The reciprocal elements 84, 85, and 86 are biased to fully extended closed positions by means of a respective spring 87, 88, and 89. The switch elements 84 and 85 are each movable to three positions of operation, while the switch element 86 has two positions of operation.

Figure 2:
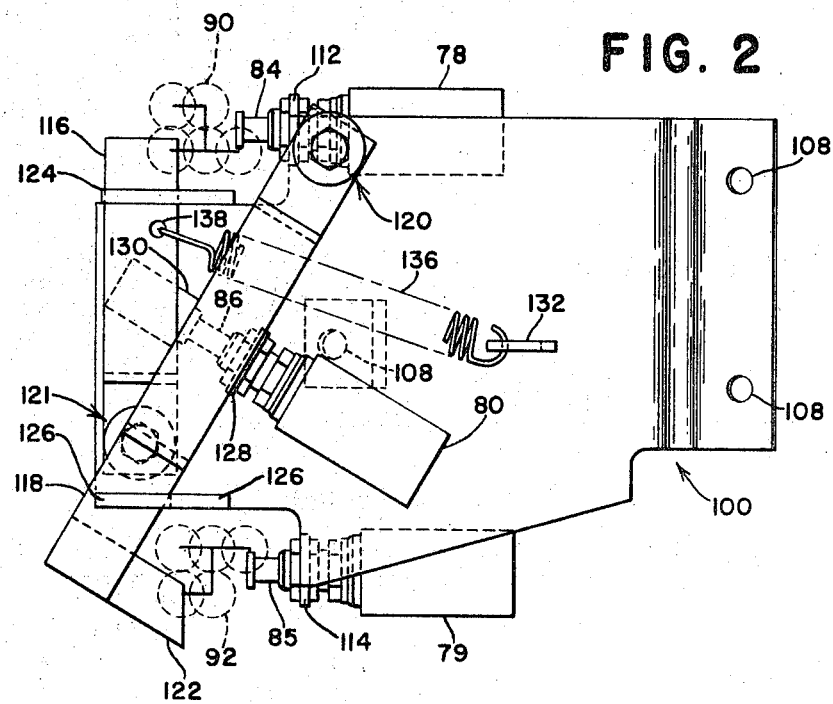
FIG. 2 is a plan view of the control mechanism for interlocking the hydrostatic front-wheel drive with the main transmission, the alternate positions of the gear and range shift levers being shown in dotted lines and the mechanism being shown removed from the tractor.
Figure 3:
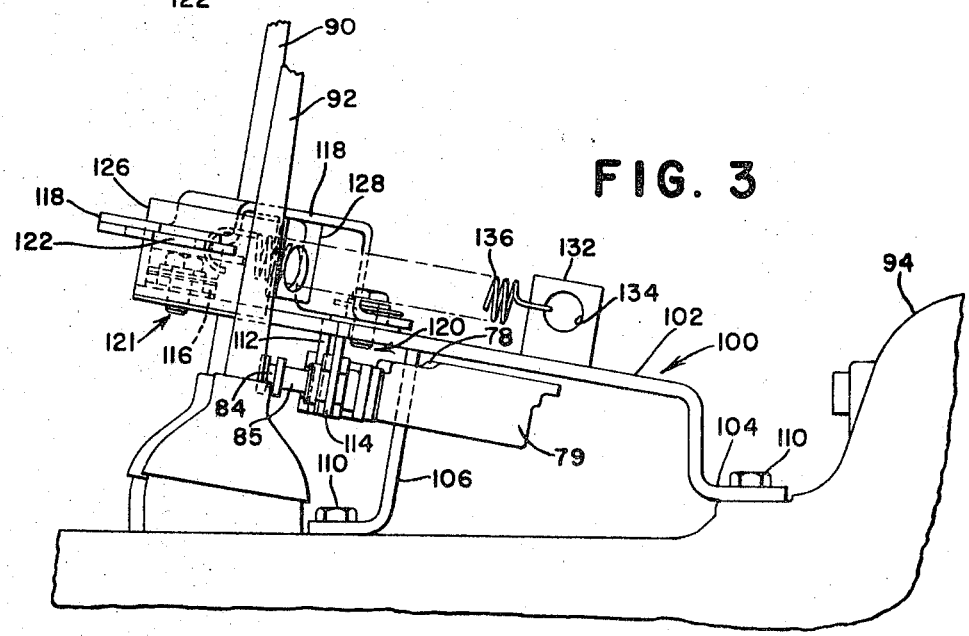
FIG. 3 is a side view of the control mechanism but with one of the switches removed for clarity and showing the mechanism mounted on the tractor and including the gear and range shift levers.
Figure 4:
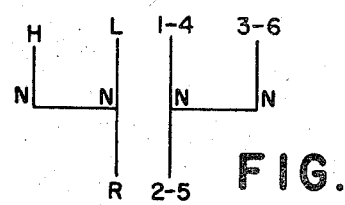
FIG. 4 shows schematically the patterns of movement of the gear and range shift levers.

The condition of the tractor transmission (not shown) in controlled by the operator through a gear shift lever 90, which establishes the gear ratio in the transmission, and a range shift lever 92, which controls the direction of movement of the tractor and also permits shifting between alternate high and low range operation of the transmission. As shown in FIG. 2 and FIG. 3, the gear and range shift levers 90 and 92 are mounted side by side on and extend upwardly from the transmission housing 94. The shift quadrants for the gear and range shift levers are shown in FIG. 4, and, as is apparent from the drawings, the gear shift lever 90 is on the right and the range shift lever 92 is on the left when viewed by the forwardly facing operator.

The levers 90 and 92 are disposed on opposite sides of a mounting plate 100 which supports the switches 78, 79, and 80. Normally, a protective covering (not shown) would be mounted over the mounting plate and switches to protect them from dust and moisture. The mounting plate 100 has a generally planar portion 102, which is inclined upwardly from its rearward end and which terminates at its rearward end in a stepped flange portion 104. The flange portion 104 in conjunction with an L-shaped leg 106 form supporting means for the mounting plate 100 and to this end have apertures 108 formed therein into which are received cap screws 110 which are fastened to the transmission housing 94. The mounting plate 100 is positioned so that its forward portion extends between the transversely spaced gear and range shift levers 90 and 92. Depending from the mounting plate 100 at transversely located positions, which are adjacent to but rearwardly of the gear and range shift levers 90 and 92, are a pair of ears 112 and 114 which support the switches 78 and 79, respectively. The switches 78 and 79 are positioned so that the rearward side of the gear and range shift levers 90 and 92 respectively, will directly engage and shift the respective reciprocal elements 84 and 85.

A pair of levers 116 and 118 are connected to the mounting plate 100 by respective pivot assemblies 120 and 121, which allow the levers to pivot in paths generally parallel to the planar portion 102 of the plate 100. The lever 116 is pivoted near the front of the mounting plate 100 on the side adjacent to the range shift lever 92 to which the switch 79 is connected and extends generally parallel to the front of the mounting plate to a position forwardly of the gear shift lever 90 wherein it may be directly contacted by the gear shift lever when the gear shift lever is in selected positions. The lever 118 is pivoted rearwardly of the lever 90 and extends transversely of the mounting plate and terminates in a projection 122 extending rearwardly from the free end of the lever 118 to a position forwardly of the range shift lever 90, wherein it is directly shiftable by the range shift lever when the lever is shifted from its neutral position to either of its forward positions.

Extending upwardly from the opposite sides of the mounting plate 100 are a pair of fore-and-aft extending, upright, flangelike projections 124 and 126. The projections have notches formed in their forward ends receiving the respective free end portions of the levers 116 and 118 and acting as stops to limit rearward swinging movement of the levers. The lever 118 has a step portion elevated from its pivotal connection 120 to provide clearance between it and the planar portion 102 of the mounting plate 100 for mounting the switch 80, which is supported on a mounting lug 128 connected to the underside of the lever 118. The lever 116 is similarly elevated from its pivotal connection 121 to provide clearance for mounting an abutment 130 on the lower side thereof, the abutment being in operative engagement with the reciprocal element 86 of the switch 80.

The mounting plate 100 is provided with a lug 132 having an aperture 134 to which one end of a tension spring 136 is connected, the other end being connected to an aperture 138 formed in the lever 116. The spring 136 biases the abutment 130 against the switch element 86 and at the same time biases the lever 116 against the rearward end of the notch formed in the projection 124.

In the preferred embodiment the gear and range shift levers are movable to place the transmission in any one of six speeds and in neutral and reverse conditions. To accomplish this, the shift levers are movable in the shift quadrants shown in FIG. 4, wherein H, L, N, and R represent high, low, neutral, and reverse, respectively, and the numerals 1—6 represent six different transmission speeds. It should be noted that the first three speeds are attainable when the range shift lever is in the low range position, while the highest three speeds are attainable when the range shift lever is in the high position. For ease in description, the hyphenated numbers shown in FIG. 4 will be used to describe a path position irregardless of whether range shift lever 90 is in the high or low position.

The switch elements 84 and 85 of the switches 78 and 79, respectively, are positioned to be fully retracted against the bias of the respective springs 87 and 88 to a closed position when the gear and range shift levers, respectively, are in their rearwardmost positions, to be in an intermediate, open position when the shift levers are in their intermediate or neutral positions, and to be fully extended by the bias of springs 87 and 88 to a second closed position when the shift levers are in their forwardmost position.

In operation, when the front-wheel drive is engaged, the ignition switch 60 will, of course, be closed and the switch 66 is shifted to one of its closed positions, energizing the lead 76. The lead 76, as stated above, is connectable to the solenoid lead 54 through the switches 78 and 79. When either of the transmission shift levers is shifted to neutral, the respective switch is opened, and no current can flow to the lead 54. However, when the range shift lever 92 is placed in reverse, the switch 79 is moved to its fully retracted or closed position, and if the gear shift lever 90 is then placed in any position except neutral, the switch 78 will be in a closed position, and electric current will be permitted to flow to the solenoid-operated valve 38 via the lead 54, whereby the valve will be actuated to place the wheel units in reverse.

Similarly, when the range shift lever 92 is in either the high or low position, the reciprocal element 85 of the switch 79 will be moved to its fully extended or closed position by means of spring 88, and when the gear shift lever 90 is in any of the positions 1—4, 2—5, or 3—6, the switch 78 will also be closed. It should be noted, however, that when the switch 79 is in its forward, closed position (upwardly in FIG. 1), it connects the upper branch of the lead 81 to the lead 82, which is connected to the switch 80. The switch 80 is normally biased by the switch spring 89 to its fully extended or closed position. However, when the range shift lever 92 is moved to its high position, it contacts the projection 122 of the lever 118 and moves the lever 118 and the switch 80 mounted thereon forwardly. If the lever 90 is in any position except its 1—4 position, the lever arm 116 is maintained in the position shown in FIG. 2, and the forward movement of the switch forces the reciprocal element 86 of the switch 80 against the abutment 130 carried by the lever 116. Since the spring 136 is stronger than the switch spring 89, the reciprocal element 86 is forced to its open or retracted position. However, with the range shift lever 92 in the high position, the switch 80 may again be closed by moving the gear shift lever 90 to the 1—4 position, so that the lever 116 is contacted and pivoted forwardly, thereby swinging the abutment 130 forwardly to allow the switch element 88 to assume its fully extended or closed position.

Thus, it can be seen that when the transmission is in its high range, the switch 80 is closed and the lead 52 is energized only when the gear shift lever 92 is in the 1—4 position, the switch 80 being open when the gear shift lever is in the 2—5 or 3—6 positions. Of course, when the range shift lever is shifted into low range, the lever 92 clears the projection 122 on the lever 118, so that the lever 118 and the switch thereon are unaffected, and the switch element remains in its closed position. Hence, the control unit permits operation of the front wheel drives only in the first four gears. Such operation is desirable to enable a pump of smaller capacity to be used that would be necessary if the front wheel drive was to be used at higher speeds. The conventional tractor transmission is generally operative in reverse at lower speeds only, so that the automatic disconnection of the front wheel drive at the higher speed range is unnecessary in reverse. Thus, the electric lead 54, which conducts the current for shifting the valve 38 into reverse, bypasses the automatic disconnect provided by switch 80.

While the preferred embodiment of the invention has been shown and described, it will be apparent that variations and modifications thereof may be made without departing from the underlying principles thereof.

We claim:

1. In a tractor having a variable ratio transmission means for driving the rear wheels, a transmission gear shift means shiftable into a plurality of positions for selectively establishing either a neutral condition or any one of a plurality of different drive ratios in the transmission, a transmission range shift means shiftable into a plurality of positions for selectively establishing a high gear ratio, a lower gear ratio, a reverse or a neutral condition in the transmission, a hydraulic fluid pump, hydraulic fluid motor means for driving the front wheels, conduit means including a direction control valve connecting said pump to said motor means, said control valve being normally in the first position-blocking fluid flow from the pump to the motor means and being selectively shiftable to second and third positions wherein fluid flow is established between the pump and motor means to drive the front wheels forwardly and rearwardly, respectively, electrical control means for shifting said control valve to its second and third positions, and electric circuit means including a current source connectable to said electric control means, the improvement comprising: first, second, and third series-connected, normally closed switches connected in said electric circuit means between said current source and said electric control means, said switches being operatively associated with said gear and range shift means for selectively connecting or disconnecting the current source to said electrical control means in response to shifting the gear and range shift means, said first and second switches being in said normally closed position when said gear and range shift means are positioned for establishing any of the transmission conditions except neutral, each of said first and second switches being movable between the normally closed position, a second closed position, and an open position, said first, second, and third switches, when in their normally closed position, connecting said current source to said electrical control means whereby said control valve is shifted to said second position, said third switch being movable to an open position in response to shifting the gear and range shift means to positions for establishing selected high gear ratios in the transmission, said second switch being movable to said second closed position disconnecting current flow to said third switch in response to shifting the range shift means for establishing said reverse condition in the transmission, thereby establishing current flow through said first and switched second switches to said electrical control means for shifting said control valve to said third position.

2. In a four-wheel drive tractor having an engine and variable ratio transmission means for driving the rear wheels, a transmission gear shift lever shiftable into a plurality of positions for selectively establishing either a neutral condition or any one of a plurality of different drive ratios in the transmission, a transmission range shift lever shiftable into a plurality of positions for selectively establishing a high gear ratio, a low gear ratio, a reverse or neutral condition in the transmission, a hydraulic fluid pump, hydraulic fluid motor means for driving the front wheels, conduit means including a direction control valve connecting said pump to said motor means, said control means being normally in a first position blocking fluid flow from the pump to the motor means and being selectively shiftable to second and third positions wherein fluid flow is established between the pump and motor means to drive the front wheels forwardly and rearwardly, respectively, electrical control means for shifting said control valve to its second and third positions, an electric circuit including a current source connectable to said electric control means, the improvement comprising: switch means operatively connected to said gear and range shift means for selectively connecting or disconnecting the current source to said electrical control means in response to shifting the gear and range shift means; said gear and range shift means being in direct contact with said switch means for disconnecting current to said electrical control means when either of said shift means is placed in the neutral position; and pivotally mounted lever means engageable by said gear and range shift means and operable for moving said switch means for disconnecting current to said electric control means in response to shifting said gear and range shift means to place the transmission in selected gear ratios.

3. The invention as defined in claim 2 wherein said switch means comprises first, second, and third switches, each having at least one open and one closed position and wherein said gear and range shift means are in direct contact with a respective one of said first and second switches and said third switch is movable between open and closed positions in response to movement of said lever means.

4. The invention as defined in claim 3 wherein said lever means includes a pair of levers, each mounted for pivotal movement in generally horizontal, partially overlapping paths, said third switch being carried by one of said levers, abutment means carried by the other of said levers engageable with the switch carried by said one lever, stop means for limiting movement of both levers, means biasing the pivotal levers against said stop means and also biasing said abutment against said switch, each of said levers having a portion thereof engageable by said gear and range shift means, whereby said third switch is moved from a normally closed position to an open position in response to relative movement between said levers when said gear and range shift means are moved to place the transmission is selected high gear ratios.

UNITED STATES PATENT OFFICE
CERTIFICATE OF CORRECTION

Patent No. 3,552,516            Dated 5 January 1971

Inventor(s) Lawrence R. Beard and Lewis K. Davis

It is certified that error appears in the above-identified paten and that said Letters Patent are hereby corrected as shown below:

Column 6, line 5, cancel "switched".

Signed and sealed this 11th day of May 1971.

(SEAL)
Attest:

EDWARD M. FLETCHER, JR.           WILLIAM E. SCHUYLER,
Attesting Officer                   Commissioner of Pate